United States Patent [19]

Hertz

[11] 4,079,446
[45] Mar. 14, 1978

[54] ROTARY PHASE CONVERTER

[75] Inventor: Claude M. Hertz, Taylorville, Ill.

[73] Assignee: Ronk Electrical Industries, Inc., Nokomis, Ill.

[21] Appl. No.: 709,864

[22] Filed: Jul. 29, 1976

[51] Int. Cl.² .............................................. H02M 5/32
[52] U.S. Cl. .................................... 363/150; 310/189; 318/219
[58] Field of Search ............... 321/7, 51, 55; 310/160, 310/169–171, 189; 315/138; 318/112, 200, 218, 219; 363/9, 150, 152, 153

[56] References Cited

U.S. PATENT DOCUMENTS

| 1,264,298 | 4/1918 | Hellmund | 321/55 |
| 1,610,522 | 12/1926 | Hellmund | 318/219 |
| 3,413,717 | 12/1968 | Peters | 310/184 |

FOREIGN PATENT DOCUMENTS

| 1,431,119 | 3/1961 | U.S.S.R. | 321/55 |

Primary Examiner—William H. Beha, Jr.
Attorney, Agent, or Firm—Koenig, Senniger, Powers & Leavitt

[57] ABSTRACT

A self-starting rotary converter for connection to a single-phase a.c. power source and for supplying polyphase current to a polyphase electrical load. A generally annular polyphase stator has a predetermined number of poles and at least three stator windings symmetrically oriented physically and electrically. An induction rotor positioned within the stator rotates about a central axis thereof when the stator is energized by single-phase a.c. power. One of the stator windings has at least one electrical tap positioned intermediate its ends, and a second stator winding has one of its ends connected to the tap to effect electrically nonsymmetrical operation of the stator. This maintains the currents supplied to the phases of the polyphase load at its maximum rating substantially balanced.

7 Claims, 7 Drawing Figures

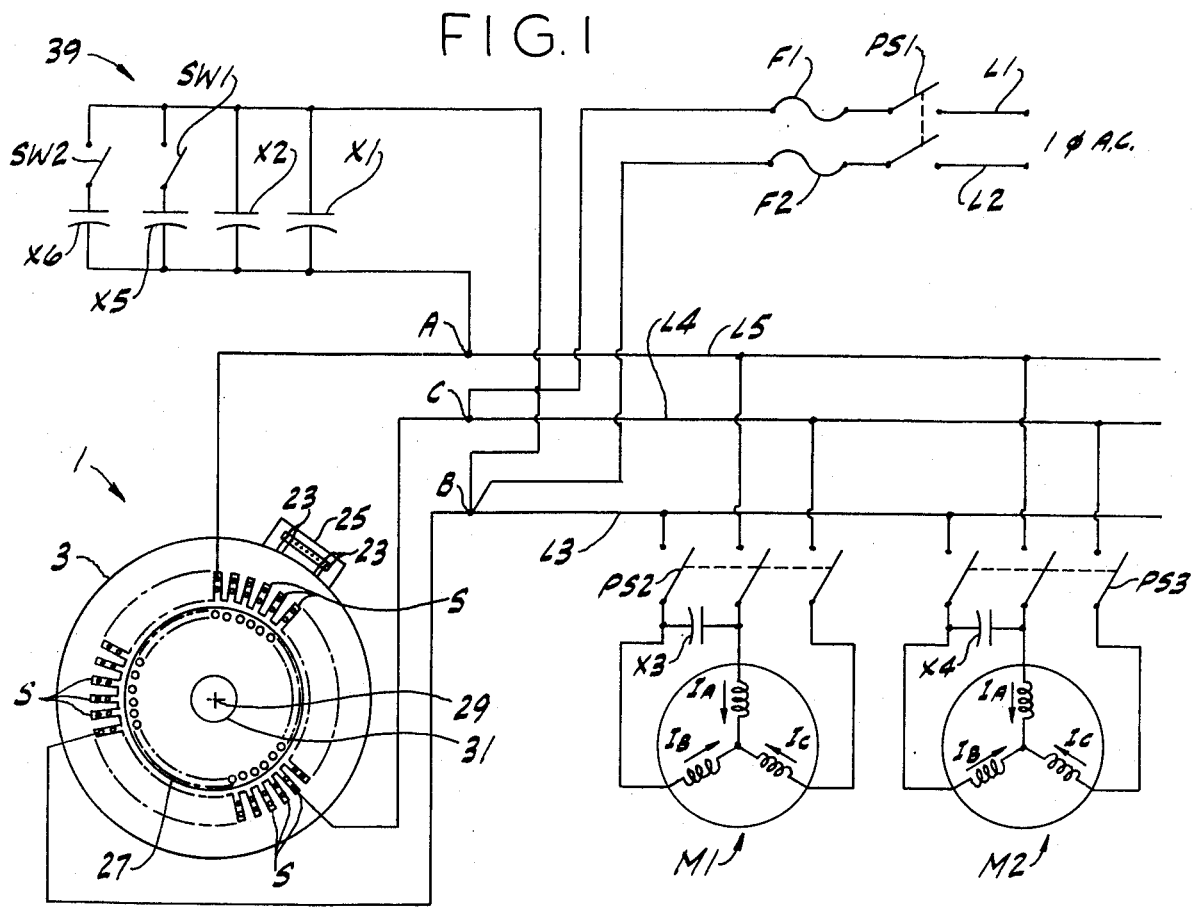
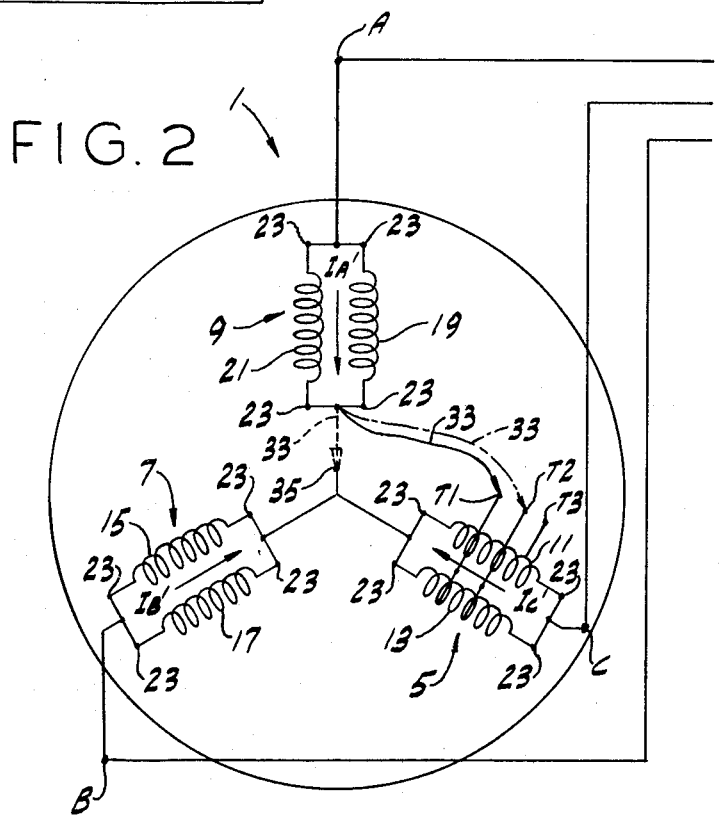
FIG. 1
FIG. 2

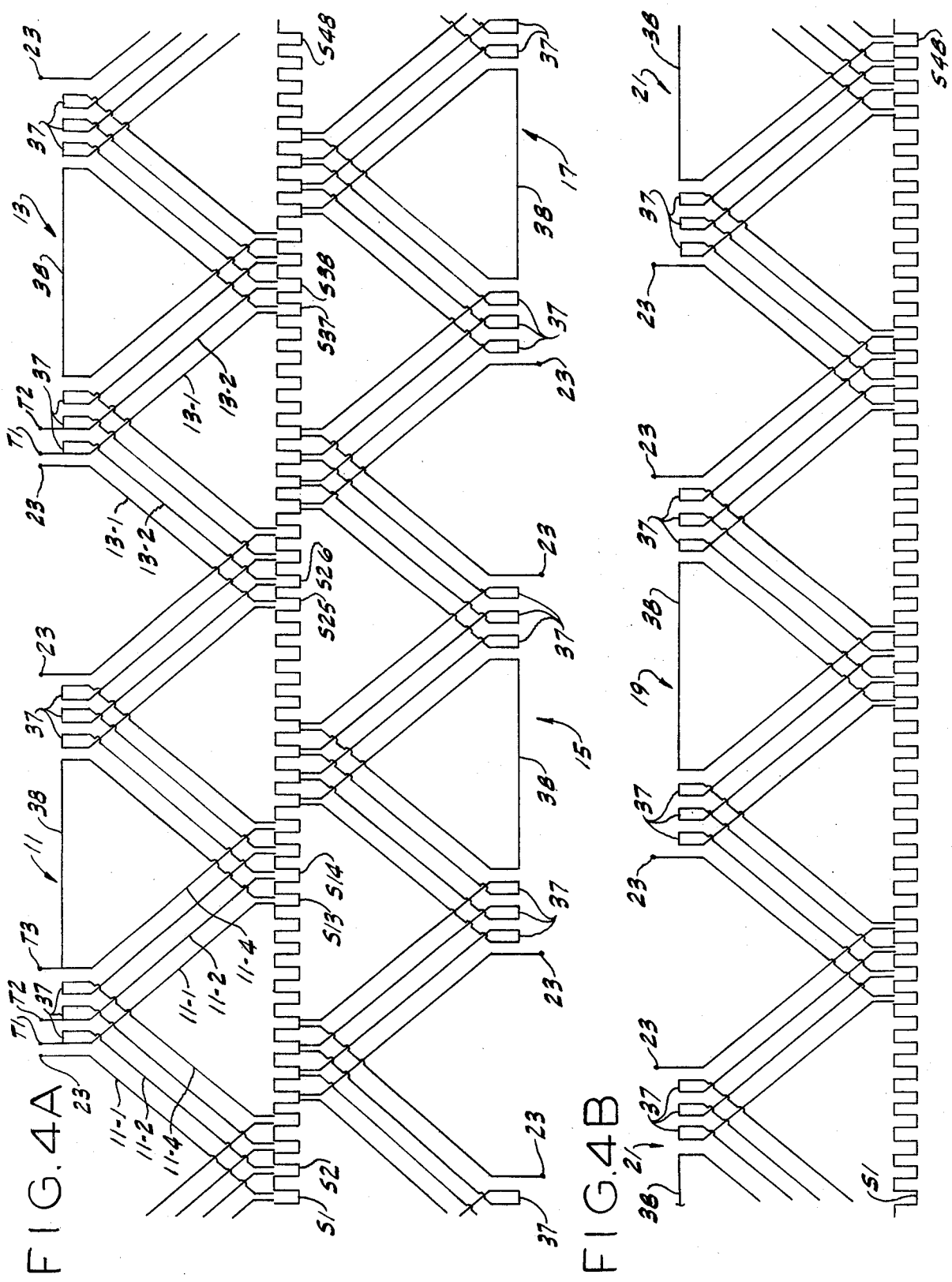

ROTARY PHASE CONVERTER

BACKGROUND OF THE INVENTION

This invention relates to a.c. rotary dynamoelectric machinery and more particularly to such machines which may be used as rotary phase converters.

Rotary converters convert single-phase a.c. utility power to three-phase power. They therefore have many applications in farm and industrial settings where three-phase electrical machinery such as motors are needed, but where three-phase utility power is unavailable. In use, such converters may supply three-phase power to one or many electrical machines and ideally a rotary converter is capable of supplying this power indefinitely so long as the electrical load does not exceed the rated capacity of the converter.

A major problem with rotary converters is that as load conditions vary, electrical imbalances are created which result in unbalanced currents in the three-phase load. Depending upon the degree of this unbalance, excessive currents may exist in one or more of the phases of the load. If the load is, for example, a three-phase motor, a current may be supplied to one of the motor windings which exceeds the maximum rated current carrying capacity for the winding and this causes overheating, particularly of the winding insulation. As a rule of thumb, the useful like of such an electrical machine is effectively halved for every 10° C. of overheating to which the insulation is subjected, necessitating more frequent machine replacement and increased expense to the owner or operator of a facility in which the machine is used.

There are presently two approaches to solving this problem. First, the rotary converter may be derated so that it supplies power to only a fraction of its rated load capacity. This, however, is no real solution since additional rotary converters are now required to service the three-phase equipment and the capital investment for the facility is increased. The second approach has been to add additional capacitance to the system, preferably on the load side of the converter. It has been found, however, that while this may improve the current balance somewhat, it is far from an adequate and economical solution to the problem since such additional capacitance increases both the cost and size of the converter.

SUMMARY OF THE INVENTION

Among the several objects of the invention may be noted the provision of a self-starting rotary converter which supplies polyphase current to a polyphase electrical load; the provision of such a rotary converter for supplying substantially balanced currents to each phase of the load at intermediate and maximum rated load conditions; the provision of such a rotary converter for supplying to each phase of the load a current which does not exceed the maximum rated current carrying capacity for that phase; the provision of such a rotary converter in which these advantageous results are obtainable when the converter is supplying polyphase power to the electrical load at either a first potential or a second potential which is twice that of the first; the provision of such a rotary converter which has increased efficiency and load carrying capacity while minimizing the use of additional capacitance for balancing the currents in the phases of the loads being supplied; and the provision of such a rotary converter which is of a relatively simple, inexpensive and easily manufactured construction.

Briefly, a self-starting rotary converter of the invention for connection to a single-phase a.c. power source and adapted to supply polyphase current to a polyphase electrical load comprises a generally annular polyphase stator having a predetermined number of poles and at least three stator windings symmetrically oriented physically and electrically. An induction rotor positioned within the stator rotates about a central axis thereof when the stator is energized by single-phase a.c. power. One of the stator windings has at least one electrical tap positioned intermediate the ends thereof, and a second of the stator windings has one end thereof adapted to be connected to the tap to effect electrically nonsymmetrical operation of the stator whereby the currents supplied to the phases of the polyphase load at its maximum rating are maintained substantially balanced. Other objects and features will be in part apparent and in part pointed out hereinafter.

BRIEF DESCRIPTION OF THE DRAWINGS

FIG. 1 is a schematic circuit diagram of a system using a rotary converter of the present invention for operation of three-phase loads from a single-phase a.c. power source;

FIG. 2 is a schematic diagram of a rotary converter of this invention whose stator windings are connected in a wye configuration;

FIGS. 4A and 4B are developed winding layout diagrams for a stator constructed according to the invention;

Corresponding reference characters indicate corresponding parts throughout the several views of the drawings.

DESCRIPTION OF A PREFERRED EMBODIMENT

Figure 3:
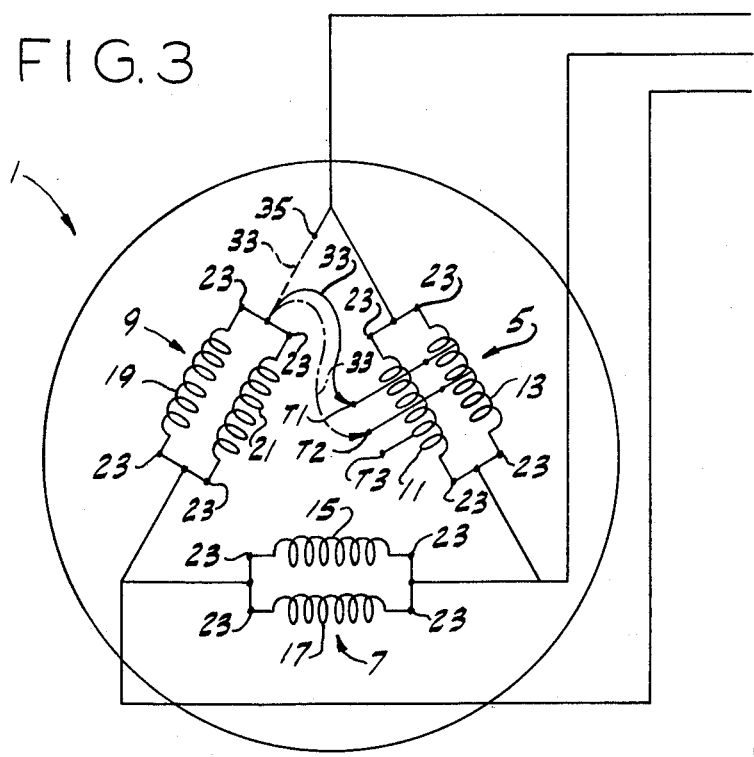
FIG. 3 is a schematic diagram of a rotary converter of this invention whose stator windings are connected in a delta configuration.
Figure 5:
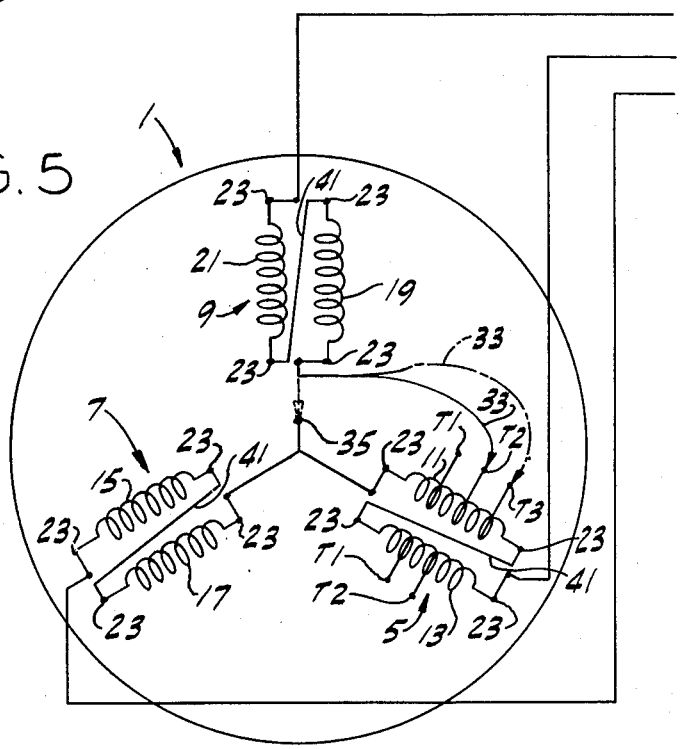
FIG. 5 is a schematic diagram of a rotary converter whose stator windings are connected for supplying three-phase power of a voltage that is twice the potential as that supplied by the converter of FIG. 2.

Referring now to the drawings, a self-starting rotary converter of the invention is indicated generally at 1. Converter 1 is connected to a source of single-phase a.c. power, e.g., 230 v. at 60 Hz., via power leads L1 and L2 which include a ganged power switch PS1 and fuses F1 and F2. Converter 1 supplies polyphase, e.g., three-phase, current, via power leads L3, L4 and L5 to a polyphase electrical load such as that represented by the two three-phase a.c. motors generally designated M1 and M2. Rotary converter 1 includes an annular shaped stator 3 which has a predetermined number of poles, for example four, and three stator windings generally designated 5, 7 and 9 respectively. These windings are symmetrically oriented both physically and electrically with respect to each other, this operation being 120° for the three-phase system of FIG. 1. Each stator winding has the same number of turns as that of each of the other stator windings and as shown in FIGS. 2 and 3, each respective winding 5, 7 and 9 is preferably comprised of two separate coils; stator winding 5 being constituted by the coils 11 and 13, stator winding 7 by the coiils 15 and 17, and stator winding 9 by the coils 19 and 21. It will be understood that each stator winding may be constituted by a single coil when, for example, converter 1 will be used with single-phase a.c. power at only one potential. If, however, converter 1 is to sometimes be supplied with power at a second potential, as will be discussed hereinafter, it is desirable to provide more than one coil for each stator winding. Stator 3 has a predetermined number of slots S which are formed in the inner face of the stator during its fabrication and the coils for the stator windings are arranged in these slots. Each end 23 of a coil set is brought out of stator 3 to a terminal box 25 located on the converter 1 housing. This permits the coil sets comprising each stator winding to be connected in parallel as shown in FIGS. 2 and 3 or in series as shown in FIG. 5.

An induction rotor 27 is positioned within the bore of stator 3 and rotates about a central or longitudinal axis 29 of the stator, on a shaft 31, when stator 3 is energized by single-phase a.c. power. Rotor 27 is a squirrel-cage induction rotor and may be either a rotor of conventional design or a high resistance rotor of the type disclosed in U.S. Pat. No. 3,670,238 or in my pending application Ser. No. 606,588 filed Aug. 21, 1975. Squirrel-cage induction rotors of the high resistance type have the advantage of permitting converter 1 to be self-starting, i.e., no starting capacitors or starting switchgear are required for start-up of the converter.

Stator windings 5, 7 and 9 are shown arranged in a wye configuration in FIG. 2 and in a delta configuration in FIG. 3, each of these configurations providing the physical and electrical symmetrical winding orientations referred to previously. In both configurations, stator winding 5 has two electrical taps, T1 and T2, positioned intermediate its ends. One end of winding 9, as represented by the arrow 33, may be connected to either electrical tap T1 or T2 to effect electrically non-symmetrical operation of stator 3 so that the current supplied to the phases of the polyphase load, i.e., motors M1 and M2, at its maximum rating are maintained substantially balanced. Connection of the end of winding 9 to tap T1 is indicated by the solid line in FIGS. 2 and 3, while connection to tap T2 is indicated by the phantom line.

Each coil 11 and 13 of stator winding 5 has an electrical tap T1 located approximately one-eighth of the way along its length and an electrical tap T2 located approximately one-fourth of the way therealong. Coil 11 has a third electrical tap T3 located further along its length for reasons discussed hereinafter. These electrical taps are each brought out of the stator to terminal box 25. If coils 11 and 13 are connected in parallel, as shown in FIGS. 2 and 3, tap T1 of coil 11 is tied to tap T1 of coil 13 at the terminal box as are the taps T2 of the respective coils. Now, when the end of winding 9, represented by the arrow 33, is connected to tap T1 of winding 5, winding 5 has only about 0.875 the number of effective turns as that of each of the other two stator windings. When end 33 is connected to tap T2 of winding 5, winding 5 has only about 0.75 the number of effective turns as that of each of the other two stator windings. When end 33 of winding 9 is connected to the end terminal constituted by a tap 35 (as indicated by the dashed line in FIGS. 2 and 3). winding 5 has the same number of effective turns as that of each of the other two stator windings. Connected in this way, the operation of rotary converter 1 would be the same as that of conventional rotary converters. Tap 35 is also brought out of stator 3 to terminal box 25.

Referring to FIG. 4A and 4B, one example of a winding layout diagram for a stator 3 constructed according to the invention is shown. Such a stator is for a three-phase converter, each phase having four poles with each pole being centered about four groups of adjacent coil turns. Stator 3 has forty-eight slots S as calculated by the formula:

$$S = m \times p \times spp$$

where
$S$ = slots,
$m$ = number of phases,
$p$ = number of poles, and
$spp$ = slots/pole/phase These slots, while being on the inner face or periphery of the stator and thus concentric with the rotor axis of rotation 29, are here represented in development by a vertical zig-zag or tooth-like line. As shown in FIGS. 4A and 4B, each coil for each stator winding is comprised of eight groups of turns, each group having a predetermined number of turns. Further, each coil group spans twelve stator slots and may be of a conventional diamond shape. Adjacent groups in each coil about which a pole is centered are connected together by a jumper 37, and the two sets of four groups comprising each coil are connected by a jumper 38. For drawing clarity, only one-half of each group is represented and two tooth-like lines rather than one are presented to illustrate how each coil is constructed. Each slot S, as shown in FIGS. 1 and 4 is occupied by a portion of two coil groups and this arrangement readily lends itself to automatic winding technique during the manufacture of stator 3.

A first group 11-1 of coil 11 of stator winding 5 has a span beginning at the stator slot designated S1 and ending at the slot designated S13, while a second group 11-2, of coil 11 has a span beginning at slot S2 and ending at slot S14. Since the end of group 11-1 represents one-eighth of the length of coil 11, electrical tap T1 is therefore located at this point. Similarly, the end of group 11-2 represents one-fourth of the length of coil 11 and electrical tap T2 is therefore located at this second point. Coil 13 of stator winding 5 is similarly configured. Here, a first group 13-1 of the coil has a span beginning at stator slot S25 and ending at slot S37, while a second group 13-2 of the coil has a span beginning at slot S26 and ending at slot S38. Electrical taps T1 and T2 are located at the ends of groups 13-1 and 13-2 respectively.

In operation, rotary converter 1 is supplied single-phase a.c. power and supplies polyphase or three-phase power to an electrical load. Referring to FIG. 1, when power switch PS1 is closed, single-phase power is supplied to a pair of converter terminals B and C which are located in terminal box 25 but which are presented as shown to aid in understanding the converter operation. For the wye-configuration of stator 3 shown in FIG. 2, terminal B is connected to one end of stator winding 7 while terminal C is connected to one end of stator winding 5. A third terminal A is also provided and this terminal is connected to the end of stator winding 9. A capacitor bank 39 is connected between terminals A and B. The capacitive reactance created by capacitors X1 and X2 of bank 39 provides the phase shift necessary for converter 1 to supply three-phase power to a three-phase electrical load, via leads L3, L4 and L5, all as is well known in the art. However, while capacitors X1 and X2 are needed for converter 1 to operate, their presence does create an impedance imbalance in the converter phases. This is because the total reactance in the circuit between terminals A and B is comprised of both inductive and capacitive reactance, while the total reactance in the other converter phases is almost all inductive reactance.

Power is supplied to motor M1 when ganged power switch PS2 is closed and to motor M2 when ganged power switch PS3 is closed. Assuming, for example, that the end of stator winding 9 represented by arrow 33 is initially connected to tap 35 (the dashed line connection), each stator winding has the same number of effective turns and this configuration is the same as that of rotary converters of conventional design. If the electrical load on motors M1 and M2 is small, the currents $I_A$, $I_B$ and $I_C$ flowing in each motor are relatively balanced and no excess currents are created in any of the motor windings. As, however, the load on the motors increases, current inbalances occur in the windings of each motor and some of these currents may exceed the maximum current carrying capacity of the winding and cause overheating of the winding insulation. The degree of current imbalance in either motor is readily determined by measuring the currents $I_A$, $I_B$ and $I_C$ flowing in the motor and using the formula found in Section 14.34 of the National Electrical Manufacturers Association (NEMA) Standard MG1-1072, viz.:

Percent unbalance = $100 \times (I_{MAX} - I_{AVE})/(I_{AVE})$ where $I_{AVE}$ = average current in the phases, and $I_{MAX}$ = phase current which has the maximum deviation from the average current Table 1 shows the results of a series of tests in which motor M1, which is, for example, rated at 25 h.p., and motor M2, which is, for example, rated at 15 h.p., present different electrical loads to converter 1 and in which end 33 of stator winding 9 is connected to tap 35. This arrangement approximates the symmetrical stator winding arrangement of conventional rotary converters. For each of three load conditions, these being 35, 40 and 45 h.p., the measured currents $I_A$, $I_B$ and $I_C$ in each motor are tabulated along with the calculated average current, maximum deviation from average current, and percent of current unbalance. This data is presented for each of four separate system capacitance values, these values being 1600, 1400, 1200 and 1000 mfd. respectively. These capacitance values are established by the values of capacitors X1 and X2 in capacitor bank 39 as well as the values of capacitors X3 and X4 which are associated with motors M1 and M2 respectively and which are on the load side of the converter and in parallel with the capacitors in bank 39. Thus, the values of each capacitor are additively combined. Additional capacitance, as represented by capacitors X5 and X6 located in bank 39 may be selectively inserted in parallel with the other capacitors as indicated by the pair of switches SW1 and SW2 to further adjust the system capacitance. The measured currents $I_A'$, $I_B'$ and $I_C'$ flowing in converter 1 are also tabulated for each load and capacitance condition as is the calculated average current, maximum deviation from average current and percentage of current unbalance.

TABLE I

STATOR OF CONVERTER 1 CONFIGURED IN CONVENTIONAL ARRANGEMENT

| CONVERTER 1 | | | | | | CAPAC- | MOTOR M1 | | | | | | | MOTOR M2 | | | | | | |
|---|---|---|---|---|---|---|---|---|---|---|---|---|---|---|---|---|---|---|---|---|
| $I_A'$ | $I_B'$ | $I_C'$ | $I_{AVE}$ | $\Delta I_{MAX}$ | % Un-bal. | ITANCE | HP | $I_A$ | $I_B$ | $I_C$ | $I_{AVE}$ | $\Delta I_{MAX}$ | % Un-bal. | HP | $I_A$ | $I_B$ | $I_C$ | $I_{AVE}$ | $\Delta I_{MAX}$ | % Un-bal |
| 40 | 32 | 31 | 34.3 | 5.7 | 16.5 | 1600 MFD | 25 | 70 | 52 | 72 | 64.7 | 8.7 | 13.4 | 10 | 36 | 21 | 30 | 29 | 8 | 27.6 |
| 37 | 26 | 34 | 32.3 | 6.3 | 19.6 | | 25 | 62 | 53 | 80 | 65 | 15 | 23.1 | 15 | 44 | 31 | 36 | 37 | 7 | 18.9 |
| 35 | 24 | 35 | 31.3 | 7.3 | 23.4 | | 30 | 67 | 62 | 90 | 73 | 17 | 23.3 | 15 | 42 | 31 | 50 | 41 | 10 | 24.4 |
| 33 | 28 | 32 | 31 | 3 | 9.7 | 1400 MFD | 25 | 60 | 59 | 70 | 63 | 7 | 11.1 | 10 | 30 | 22 | 30 | 27.3 | 5.3 | 19.5 |
| 30 | 24 | 34 | 29.3 | 5.3 | 18.2 | | 25 | 52 | 63 | 80 | 65 | 15 | 23.1 | 15 | 37 | 35 | 50 | 40.7 | 9.3 | 22.9 |
| 29 | 22 | 36 | 29 | 7 | 24.1 | | 30 | 56 | 74 | 92 | 74.7 | 18.7 | 25.0 | 15 | 34 | 36 | 50 | 40 | 10 | 25.0 |
| 26 | 28 | 32 | 28.7 | 3.3 | 11.6 | 1200 MFD | 25 | 52 | 67 | 72 | 63.7 | 11.7 | 18.3 | 10 | 24 | 24 | 33 | 27 | 6 | 22.2 |
| 26 | 23 | 35 | 28 | 7 | 25.0 | | 25 | 43 | 70 | 80 | 64.3 | 21.3 | 33.1 | 15 | 32 | 40 | 51 | 41 | 10 | 24.4 |
| 25 | 21 | 36 | 27.3 | 8.7 | 31.7 | | 30 | 46 | 85 | 94 | 75 | 29 | 38.7 | 15 | 29 | 40 | 54 | 41 | 13 | 31.7 |
| 23 | 25 | 33 | 27 | 6 | 22.2 | 1000 MFD | 25 | 44 | 74 | 75 | 64.3 | 20.3 | 31.6 | 10 | 18 | 27 | 34 | 26.3 | 8.3 | 31.7 |
| 22 | 22 | 36 | 26.7 | 9.3 | 35.0 | | 25 | 35 | 80 | 84 | 66.3 | 31.3 | 47.2 | 15 | 27 | 46 | 54 | 42.3 | 15.3 | 36.2 |
| 21 | 21 | 38 | 26.7 | 11.3 | 42.5 | | 30 | 40 | 100 | 101 | 80.3 | 40.3 | 50.2 | 15 | 23 | 46 | 58 | 42.3 | 19.3 | 45.7 |

As illustrated in Table 1, for almost any system capacitance value, the percent of current unbalance in each motor and the converter increases as the load increases and excessive currents are present in at least one of the motor windings, as for example in motor M1 whose maximum rated current carrying capacity is typically 68–70 amps for any phase. Although the current unbalance in the stator of converter 1 increases as the load increases, none of its stator currents exceed or even closely approach the maximum rated current carrying capacity of the stator 3 winding which is, for example, 80 amps.

Referring to FIG. 2, if in accordance with the invention the end 33 of stator winding 9 is moved from tap 35 to tap T1 (the solid line connection) there is an increase in the inductive reactance in the circuit path from terminals B to A since that portion of stator winding 5 between tap 35 and tap T1 is now added to this circuit path, and there is simultaneously a decrease in the inductive reactance in the circuit path from terminals C to A since this same portion of stator winding 5 is taken out of this latter circuit path. The amount of inductive reactance in the circuit path between terminals B and C is unaffected by this movement inasmuch as all of the turns of all stator windings remain active. If one were to now look from the load back into the converter, one would see that these reactance changes produce two effects. First the magnitude of the currents supplied to the phases of the load has changed and secondly, the phase relationship between these currents has also changed.

This occurs because the impedance unbalance previously existing between phases has now been at least partially corrected. This unbalance was primarily due to the capacitive reactance existing in the circuit path between terminals B and A because of the capacitors in bank 39. By moving end 33 of winding 9 to electrical tap T1, inductive reactance is introduced into the circuit which combines with that already present because of stator winding 7 and this increased inductive reactance tends to offset the capacitive reactance. This alters both the total impedance and the phase angle for this phase. Simultaneously, inductive reactance has been taken out of the circuit path between terminals A and C which alters both the total impedance and phase angle for this phase. The net effect is that the relative magnitudes of the currents in each phase is changed as is the phase relationship between the currents. The combined effect of these changes is discernible in two ways; first and most importantly as a decrease in the unbalance in the currents supplied to the electrical load, i.e., motors M1 and M2, and also as an increase in the current unbalance in stator 3. The increase in the current unbalance in the stator 3 windings, however, does not deleteriously affect the operation of converter 1. This is discussed hereinafter.

The dramatic and advantageous decrease in load current unbalance is indicated in the data tabulated in Table 2.

does reduce the current unbalance somewhat as reflected in the Table 1 data, the addition of capacitance, by itself, is insufficient to attain the minimal degree of current unbalance which is necessary for best system operation. Thus, for example, the least current unbalance that was obtainable for motor M2 for the load condition discussed above, when the stator winding arrangement for converter 1 corresponded to the symmetrical winding arrangement of conventional rotary converters, strictly by adding capacitance, was 19.5% as shown in Table 1. It would, perhaps, be possible to further improve the current balance in the load by adding more capacitors to capacitor bank 39. However, it would not only be impossible to attain the degree of current balance which is adhieved by a converter 1 made in accordance with this invention but also the addition of capacitors to bank 39 increases both the cost and size of a converter installation.

Further improvement in the degree of current unbalance may be obtained in accordance with the present invention, for greater load conditions, by moving end 33 of stator winding 9 to electrical tap T2, as indicated

TABLE II

CONNECTION TO ELECTRICAL TAP T1,
STATOR WINDING 5 HAVING ≈.875 THE NUMBER
OF EFFECTIVE TURNS

| CONVERTER I | | | | | | | MOTOR M1 | | | | | | | MOTOR M2 | | | | | | |
|---|---|---|---|---|---|---|---|---|---|---|---|---|---|---|---|---|---|---|---|---|
| $I_A'$ | $I_B'$ | $I_C'$ | $I_{AVE}$ | $\Delta I_{MAX}$ | % Unbal. | CAPACITANCE | HP | $I_A$ | $I_B$ | $I_C$ | $I_{AVE}$ | $\Delta I_{MAX}$ | % Unbal. | HP | $I_A$ | $I_B$ | $I_C$ | $I_{AVE}$ | $\Delta I_{MAX}$ | % Unbal. |
| 46 | 28 | 31 | 35 | 11 | 31.4 | 1600 MFD | 25 | 76 | 58 | 60 | 64.7 | 11.3 | 17.5 | 10 | 35 | 28 | 26 | 29.7 | 5.3 | 18.0 |
| 44 | 24 | 45 | 37.7 | 13.7 | 36.3 | | 25 | 69 | 55 | 57 | 60.3 | 8.7 | 14.4 | 15 | 42 | 34 | 44 | 40 | 6 | 15.0 |
| 42 | 21 | 46 | 36.3 | 15.3 | 42.2 | | 30 | 72 | 66 | 80 | 72.7 | 7.3 | 10.1 | 15 | 39 | 36 | 46 | 40.3 | 5.7 | 14.1 |
| 38 | 24 | 31 | 31 | 7 | 22.6 | 1400 MFD | 25 | 67 | 62 | 62 | 63.7 | 3.3 | 5.2 | 10 | 27 | 27 | 27 | 27 | 0 | 0.0 |
| 37 | 22 | 44 | 34.3 | 12.3 | 35.9 | | 25 | 59 | 62 | 68 | 63 | 5 | 7.9 | 15 | 35 | 38 | 45 | 39.3 | 5.7 | 14.4 |
| 35 | 20 | 46 | 33.7 | 13.7 | 40.6 | | 30 | 63 | 76 | 83 | 74 | 11 | 14.9 | 15 | 31 | 40 | 48 | 39.7 | 8.7 | 24.4 |
| 33 | 26 | 41 | 33.3 | 7.7 | 23.0 | 1200 MFD | 25 | 59 | 66 | 63 | 62.7 | 3.7 | 5.9 | 10 | 21 | 26 | 30 | 25.7 | 4.7 | 18.2 |
| 32 | 21 | 44 | 32.3 | 11.7 | 36.1 | | 25 | 50 | 70 | 72 | 64 | 14 | 21.8 | 15 | 29 | 42 | 48 | 39.7 | 10.7 | 26.9 |
| 31 | 19 | 46 | 32 | 14 | 43.8 | | 30 | 56 | 85 | 86 | 75.7 | 19.7 | 26.0 | 15 | 25 | 44 | 51 | 38.3 | 13.3 | 34.8 |
| 41 | 23 | 29 | 31 | 10 | 32.3 | 1000 MFD | 25 | 51 | 73 | 66 | 63.3 | 12.3 | 19.5 | 10 | 16 | 30 | 33 | 26.3 | 10.3 | 39.2 |
| 29 | 22 | 45 | 32 | 13 | 40.6 | | 25 | 42 | 78 | 74 | 64.7 | 22.7 | 35.1 | 15 | 24 | 48 | 52 | 41.3 | 17.3 | 41.9 |
| 28 | 41 | 48 | 39 | 11 | 28.2 | | 30 | 50 | 100 | 94 | 81.3 | 31.3 | 38.5 | 15 | 18 | 49 | 56 | 41 | 23 | 56.1 |

The data is presented for the same capacitance and load conditions previously described but with the end 33 of coil 9 connected to tap T1. In comparing data in Table 2 with that in Table 1, it will be noted that in most instances the percent current unbalance for each motor has decreased. The most striking example of this is the 1,400 mfd. system capacitance condition where motor M1 is operating with a 25 hp. load and motor M2 a 10 hp. load. For the previous or dashed line connection shown in FIG. 2, motor M1 had an 11.1% current unbalance, motor M2 a 19.5% unbalance and converter 1 a 9.7% unbalance. For the solid line connection shown in FIG. 2, in keeping with the present invention, the current unbalance of motor M1 has been reduced to 5.2% and, most significantly, motor M2 now has no currznt unbalance at all. Also, the currents in motor M1 are all now below the maximum rated current carrying capacity of the motor windings. On the other hand, the current unbalance in converter 1 has increased to 22.6% but the winding currents in stator 3 are all well below the maximum rated current carrying capacity for the windings and thus there is no danger of overheating in any of these windings.

It is important to realize in studying the data in Table 1 and Table 2 that while the addition of capacitance by the phantom line in FIG. 2. This further increases the inductive reactance in the circuit path from terminals B to A while further decreasing the inductive reactance in the circuit path from terminals C to A. The amount of inductive reactance in the circuit path from terminals B to C is still unchanged as all the turns in all the stator windings continue to operate as active turns. If one were to now again look from the load back into the converter, one would again note a change both in the magnitude of the currents supplied to the phases of the load and a change in the phase relationship between the currents. As before, this occurs because the effect of the capacitive reactance in the circuit path between terminals A and B has been additionally offset by adding more inductive reactance in this path, changing the total impedance in the circuit and its phase angle still further. Additional inductive reactance has been simultaneously removed from the circuit between terminals A and C to further change the total impedance and phase angle for this circuit. Thus, the relative magnitudes of the currents in each phase are changed as are their phase reltionships. Again, this is reflected as a marked decrease in the current unbalance in the load.

This further improvement in the current balance in the load may be seen in the data in Table 3.

TABLE III
CONNECTION TO ELECTRICAL TAP T2, STATOR WINDING 5 HAVING ≈.75 THE NUMBER OF EFFECTIVE TURNS

| CONVERTER 1 | | | | | | CAPAC-ITANCE | MOTOR M1 | | | | | | | MOTOR M2 | | | | | | |
|---|---|---|---|---|---|---|---|---|---|---|---|---|---|---|---|---|---|---|---|---|
| $I_A'$ | $I_B'$ | $I_C'$ | $I_{AVE}$ | $\Delta I_{MAX}$ | % Unbal. | | HP | $I_A$ | $I_B$ | $I_C$ | $I_{AVE}$ | $\Delta I_{MAX}$ | % Unbal. | HP | $I_A$ | $I_B$ | $I_C$ | $I_{AVE}$ | $\Delta I_{MAX}$ | % Unbal. |
| 54 | 24 | 52 | 43.3 | 19.3 | 44.6 | 1600 MFD | 25 | 77 | 61 | 53 | 63.7 | 13.3 | 20.9 | 10 | 33 | 31 | 22 | 28.7 | 6.7 | 23.3 |
| 52 | 20 | 54 | 42 | 22 | 52.4 | | 25 | 69 | 59 | 61 | 63 | 6 | 9.5 | 15 | 40 | 40 | 38 | 39.3 | 1.3 | 3.4 |
| 51 | 17.5 | 57 | 41.8 | 24.3 | 58.2 | | 30 | 73 | 72 | 75 | 73.3 | 1.7 | 2.3 | 15 | 37 | 38 | 42 | 39 | 3 | 7.7 |
| 46 | 20 | 50 | 38.7 | 18.7 | 48.3 | 1400 MFD | 25 | 66 | 65 | 54 | 61.7 | 7.7 | 12.4 | 10 | 26 | 30 | 25 | 27 | 3 | 11.1 |
| 46 | 17 | 54 | 39 | 22 | 56.4 | | 25 | 59 | 67 | 62 | 62.7 | 4.3 | 6.9 | 15 | 35 | 42 | 41 | 39.3 | 4.3 | 11.0 |
| 44 | 16 | 56 | 38 | 22 | 57.9 | | 30 | 64 | 72 | 78 | 74 | 10 | 13.5 | 15 | 30 | 43 | 46 | 39.7 | 9.7 | 24.4 |
| 41 | 19 | 49 | 36.3 | 17.3 | 47.7 | 1200 MFD | 25 | 61 | 70 | 58 | 63 | 7 | 11.1 | 10 | 19 | 30 | 27 | 25.3 | 6.3 | 25.0 |
| 41 | 16.5 | 54 | 37.2 | 20.7 | 55.6 | | 25 | 51 | 73 | 65 | 63 | 12 | 19.0 | 15 | 30 | 46 | 46 | 40.7 | 10.7 | 26.2 |
| 40 | 17 | 54 | 37 | 20 | 54.1 | | 30 | 58 | 90 | 81 | 76.3 | 18.3 | 24.0 | 15 | 25 | 47 | 49 | 40.3 | 15.3 | 38.0 |
| 37 | 19 | 40 | 32 | 13 | 40.7 | 1000 MFD | 25 | 54 | 77 | 60 | 63.7 | 13.3 | 20.9 | 10 | 16 | 32 | 30 | 26 | 10 | 38.5 |
| 37 | 17 | 54 | 36 | 19 | 52.8 | | 25 | 45 | 82 | 70 | 65.7 | 20.7 | 31.5 | 15 | 24 | 50 | 49 | 41 | 17 | 41.5 |
| 38 | 19 | 58 | 38.3 | 19.3 | 49.1 | | 30 | 50 | 100 | 89 | 79.7 | 29.7 | 37.2 | 15 | 20 | 54 | 55 | 43 | 23 | 53.5 |

In most instances, the percent current unbalance in motors M1 and M2 has decreased. Two examples of this are the 40 and 45 hp. load conditions with 1600 mfd. of capacitance in the system. For the 40 hp. load condition, the current unbalance in motor M1 has decreased from 23.1% as shown in Table 1 to 9.5% in Table 3 while that in motor M2 has decreased from 18.9% to 3.4%. Similarly, for the 45 hp. load condition the current unbalance in motor M1 has improved from the 23.3% value listed in Table 1 to 2.3% and that of motor M2 has improved from 24.4% to 7.7%. In this last example, motor M1 is operating with a 30 hp. load which is greater than its maximum rated load. Still, even at this extreme condition converter 1 is supplying balanced currents to the motor although they slightly exceed the maximum current rating of the motor.

With respect to the current imbalances in motors M1 and M2 for the 35 hp. load condition with 1400 mfd. in the system these values have increased from the 5.2 and 0% values shown in Table 2 to 12.4 and 11.1% respectively. What this means is that for each load and capacitance condition there is an ideal tap location where current imbalance is a minimum and that if winding 9 is connected to a tap located at other than this ideal location, a higher percentage of current unbalance results. This is why more than one electrical tap is provided on stator winding 5 of converter 1, since it permits the converter user to determine which tap location is best suited for a particular load condition to insure best system performance. Thus, it will be understood that more than two electrical taps T1 and T2 may be provided on stator winding 5 and that the two intermediate winding taps discussed herein are for illustrative purposes only.

Because of the electrically asymmetrical operation of a stator 3 in accordance with the present invention, it is possible for a converter 1 to have a higher rated capacity than rotary converters of conventional design. Thus, for example, a converter of conventional design operating in a system with motors M1 and M2 would not be capable of supplying currents to the motors not exceeding the maximum rated current carrying capacity of at least one of the motors, if the combined loads on the motors was 35 hp. or greater. This can be seen in the Table 1 data which is for a converter 1 configuration which approximates converters of conventional design. There, for any load and capacitance condition shown the current in one of the motor phases, for example $I_C$ for motor M1 at least equals or exceeds the maximum current rating. By contrast, the data in Tables 2 and 3 indicates that converter 1, if constructed and operated in accordance with the invention is capable of supplying substantially balanced currents which do not exceed the current rating for any motor phase for total motor load conditions somewhere between 40 and 45hp. which is a significant rating increase. Thus, converter 1 may be given a higher load rating than conventional rotary converters and the converter is a more efficient machine than these others.

Figure 6:
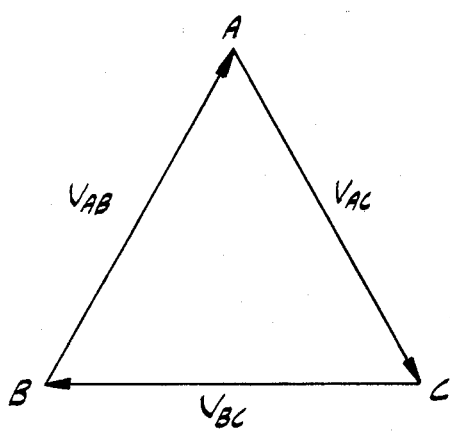
FIG. 6 is a voltage vector diagram to aid in understanding the operation of a rotary converter of the invention.

Referring now to FIG. 6, a voltage vector diagram is presented to further aid in understanding the operation of rotary converter 1. In the ideal situation depicted in FIG. 6, each phase voltage $V_{AB}$, $V_{AC}$ and $V_{BC}$ is equal in magnitude and their phase relationships are such that if plotted end-to-end, as shown, they form an equilateral triangle. If $V_{BC}$ is considered as a constant vector, which reflects the fact that no impedance change occurs in the circuit path between terminals B and C in FIGS. 1 and 2 as the tap connections are changed, then as the load to which converter 1 supplies power increases, $V_{AB}$ tends to collapse, i.e., the point A shifts to the left and down and an unbalanced situation is created. This situation may be partially corrected by adding capacitance on the load side of converter 1 as this tends to raise point A. However, an unbalanced situation still exists and can be overcome only by moving the end 33 of coil 9 to either tap T1 or T2 on stator winding 5 (as shown by the solid and phantom lines in FIG. 2) as this moves point A to the right to adjust the ratio of $V_{AB}$ to $V_{AC}$ so that they may again be equal.

It is frequently desirable for rotary converter 1 to supply power to a polyphase load to a second potential which is typically twice the first value referred to in the above discussion, i.e., 460 v. For converter 1 to supply power to motors M1 and M2 at this higher potential, the two coils comprising each stator 3 winding are connected in series instead of in parallel. This series connection of coils is shown in FIG. 5. The series connection is accomplished by properly connecting the ends 23 of each coil set, as shown in the figure, with a jumper 41. This is done at terminal box 25. In performing this series connection of coil sets, care must be taken to insure that the proper phase relationships between the stator 3 windings are maintained.

Since unbalanced current conditions in the load will occur at this higher potential, electrical taps are provided so that the effective turns of stator winding 5 may be decreased to 0.875 or 0.75 those of each of the other stator windings in order to balance the load currents. With coils 11 and 13 series connected, stator winding 5 has sixteen turns instead of eight and with reference to FIG. 4, it will be seen that electrical tap T2 on coil 11 now corresponds to one-eighth the length of stator winding 5. Therefore, by connecting the end 33 of stator winding 9 to tap T2, as shown by the solid line in FIG. 5, the 0.875 condition previously discussed may be achieved. To achieve the 0.75 condition, however, the third electrical tap T3 to coil 11 is provided, this tap being located at the end of the fourth group of coil turns 11-4. The connection of end 33 of coil 9 to tap T3 is indicated by the phantom line in FIG. 5.

It will be understood from the foregoing discussion that the other stator configurations are possible in which a different number of slots S are provided for different winding arrangements and that the electrical taps provided in such winding arrangements may be at other than one-eighth and one-fourth the span of winding sets 11 and 13 with the same advantageous results being obtained.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A self-starting rotary converter for connection to a single-phase a.c. power source and adapted to supply polyphase current to a polyphase electrical load, said converter comprising:
   a generally annular polyphase stator having a predetermined number of poles and at least three stator windings symmetrically oriented physically and electrically, each winding having a substantially equal number of active turns; an induction rotor positioned within said stator for rotation about a central axis thereof when the stator is energized by single-phase a.c. power; and
   one of said stator windings having at least one electrical tap positioned intermediate the ends thereof, and a second of said stator windings having one end thereof adapted to be connected to said tap to effect electrically nonsymmetrical operation of said stator without changing the number of active turns of any winding whereby the currents supplied to the phases of the polyphase load at its maximum rating are maintained substantially balanced.

2. A rotary converter as set forth in claim 1 wherein the stator is wye-wound.

3. A rotary converter as set forth in claim 1 wherein the stator is delta-wound.

4. A rotary converter as set forth in claim 1 wherein the first said stator winding has first and second electrical taps.

5. A rotary converter as set forth in claim 4 wherein the relative locations of the first and second electrical taps along the first said stator winding are such that when the end of the aforesaid second stator winding is connected to the first electrical tap, the first said stator winding has about 0.875 the number of effective turns as that of each of the other stator windings, and when the end of the aforesaid second stator winding is connected to the second electrical tap, said first stator winding has about 0.75 the number of effective turns as that of each of the other stator windings.

6. A rotary converter as set forth in claim 5 wherein each stator winding has at least two separate coils adapted to be connected in parallel for supplying three-phase a.c. power at a first potential and adapted to be connected in series for supplying three-phase a.c. power at a second and higher potential, each coil of said first stator winding having a first and second electrical tap.

7. A rotary converter as set forth in claim 6 wherein corresponding electrical taps on each coil of said first stator winding are interconnected when said coils are connected in parallel and wherein one of the coils has a third electrical tap whose relative location along said coil is such that when said coils are connected in series and the end of said second stator winding is connected to said second electrical tap on said three tap coil the first stator winding has about 0.875 the number of effective turns as that of each of the other stator windings and when the end of said second stator winding is connected to the third electrical tap said first stator winding has about 0.75 the number of effective turns as that of each of the other stator windings.

* * * * *